C. N. JOHNSON.
TOOLING DEVICE FOR STONE AND THE LIKE.
APPLICATION FILED FEB. 15, 1911.
1,000,813.
Patented Aug. 15, 1911.
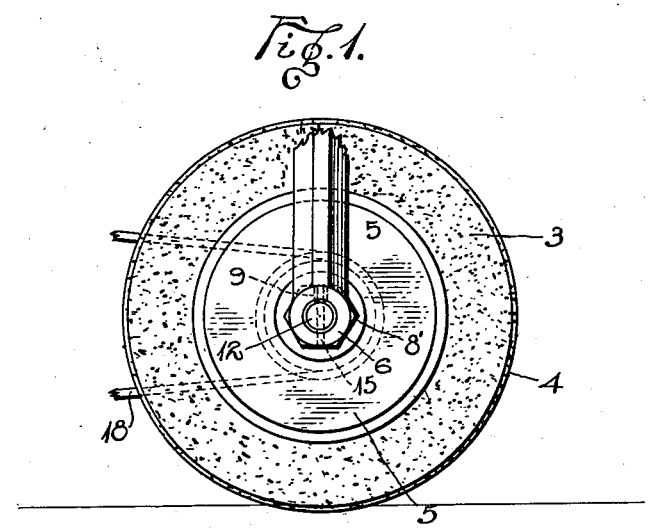
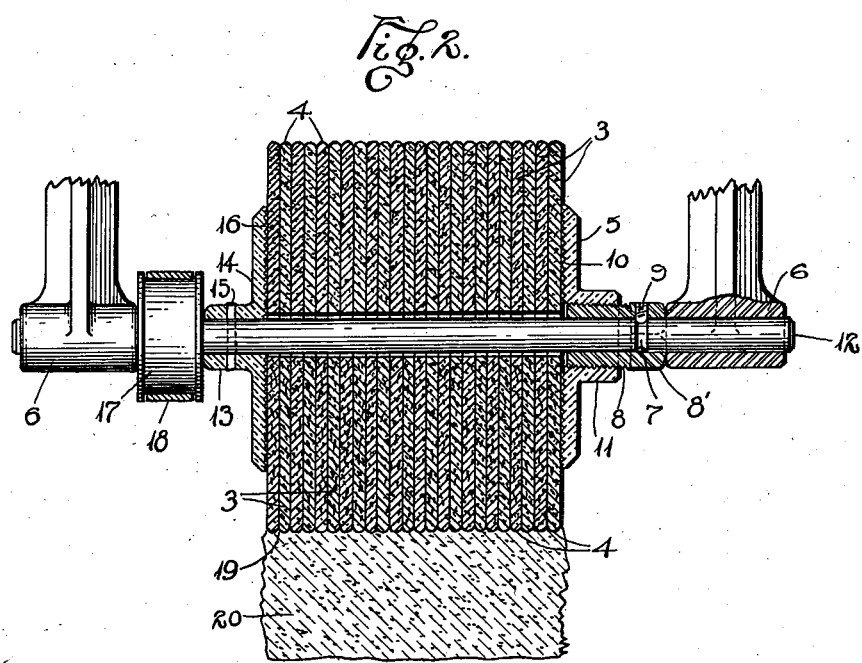

UNITED STATES PATENT OFFICE.

CARL N. JOHNSON, OF AMHERST, OHIO.

TOOLING DEVICE FOR STONE AND THE LIKE.

1,000,813. Specification of Letters Patent. Patented Aug. 15, 1911.

Application filed February 15, 1911. Serial No. 608,763.

*To all whom it may concern:*

Be it known that I, CARL N. JOHNSON, a citizen of the United States, residing at Amherst, in the county of Lorain and State of Ohio, have invented certain new and useful Improvements in Tooling Devices for Stone and the Like, of which the following is a specification.

This invention relates to tooling devices for stone, and the like, and has for its object to provide an inexpensive, rapid and efficient means for tooling the surface of building stone, such as ashlar, etc.

At present the surface of stone is tooled manually by hand-tools, which method is laborious and expensive, while this invention is embodied in a plurality of carborundum or other abrasve disks suitably mounted on a shaft, which upon being revolved mechanically give a tooling effect to stone brought in contact therewith, as will be hereinafter described.

The invention is illustrated in the accompanying drawings, in which similar reference characters indicate similar parts, and in which—

Figure 1 is an end view of the device, and Fig. 2 is a vertical central section thereof, parts thereof being shown in full.

Referring specifically to the drawings the plurality of carborundum or abrasive disks are shown at 3 and have the periphery thereof convexed as indicated at 4. These disks 3, which are of equal diameter and of suitable thickness, are mounted on the shaft 12 by means of central holes therethrough. As shown, the means employed to clamp or mount the disks on the shaft 12 consists of a plate 14 at one end having a collar 13 and rigidly secured to the shaft by a cotter pin 15, and a similar plate 5 at the other end having an internally threaded collar 11 engaging the externally threaded revoluble sleeve 8 on the said shaft. This sleeve 8 has an exposed end 8′ which is of a hexagonal cross section for convenience in turning same, and a screw 9 engages an annular groove 7 in the shaft 12 to prevent longitudinal movement of the sleeve. A pulley wheel 17 is also mounted on the shaft 12 for revolving same by means of a belt 18. This shaft can be revolved, however, in any convenient manner. The ends of the shaft are journaled in the bearings 6, which are suspended or supported in any convenient manner.

The inner faces of the plates 5 and 14 are toothed or roughened as shown, respectively, at 10 and 16. The said plates are therefore adapted to tightly grip and clamp the disks 3 together, and by turning the sleeve 8 it will be seen that the plates 5 and 14 can either be brought together or separated.

In use, the disks which in their assembled position form a wheel having a corrugated or crimped surface are revolved at a suitable speed and the stone, as shown at 20, in being brought into a tangential relation therewith is given a fluted surface 19, which resembles a tooling effect.

This device can be used in connection with stone and marble planers, or can be used in various other ways familiar in the art. It is also understood that this invention can be altered in its details within the scope of the appended claims, and it is not desired to limit same to the specific construction shown and described.

Having described my invention, what I claim as new is:—

1. A device of the character described comprising a plurality of abrasive disks having convexed peripheries and central holes therethrough, a shaft passing through the said holes, a plate on the said shaft at one end of the said disks and rigid with the said shaft, a plate on the said shaft at the opposite end of the said disks having a threaded collar, and a threaded sleeve rotatably mounted on the said shaft having screw engagement with the said collar and having an exposed end bearing means for turning same to move the latter plate longitudinally.

2. A device of the character described comprising a plurality of abrasive disks having convexed peripheries and central holes therethrough, a shaft passing through the said holes, a plate on the said shaft at one end of the said disks and rigid with the said shaft, a plate on the said shaft at the opposite end of the said disks having a threaded collar, a threaded sleeve rotatably mounted on the said shaft having screw engagement with the said collar, means for preventing longitudinal movement of the said sleeve, and means for rotating the said sleeve to move the latter plate longitudinally.

3. A device of the character described comprising a plurality of abrasive disks having convexed peripheries and central holes therethrough, a shaft passing through the said holes and having an annular groove therein at one end of the said disks, a plate on the said shaft at the other end of the said disks and rigid with the said shaft, a plate at the opposite end of the said disks having a threaded collar, a threaded sleeve rotatably mounted on the said shaft and having a screw engagement with the said collar, a screw mounted in the said sleeve and engaging in the said annular groove, and means for turning the said sleeve to move the latter plate longitudinally.

In testimony whereof I do affix my signature in presence of two witnesses.

CARL N. JOHNSON.

Witnesses:
J. B. GILLETTE,
B. S. GILLETTE.